US012802854B2

(12) United States Patent
Hsieh

(10) Patent No.: US 12,802,854 B2
(45) Date of Patent: Nov. 17, 2026

(54) SOLENOID ACTUATOR AND METHOD FOR MAKING THE SAME

(71) Applicant: CHIA WANG OIL HYDRAULIC INDUSTRIAL CO., LTD., Taichung City (TW)

(72) Inventor: Chin-Sheng Hsieh, Taichung City (TW)

(73) Assignee: CHIA WANG OIL HYDRAULIC INDUSTRIAL CO., LTD., Taichung City (TW)

( * ) Notice: Subject to any disclaimer, the term of this patent is extended or adjusted under 35 U.S.C. 154(b) by 241 days.

(21) Appl. No.: 18/543,186

(22) Filed: Dec. 18, 2023

(65) Prior Publication Data

US 2024/0242868 A1 Jul. 18, 2024

(30) Foreign Application Priority Data

Jan. 17, 2023 (TW) ................................ 112102067

(51) Int. Cl.
*H01F 7/08* (2006.01)
*H01F 41/02* (2006.01)

(52) U.S. Cl.
CPC ............ *H01F 7/081* (2013.01); *H01F 41/02* (2013.01); *H01F 2007/086* (2013.01)

(58) Field of Classification Search
CPC .... H01F 7/081; H01F 41/02; H01F 2007/086; H01F 2007/085; H01F 7/127

(Continued)

(56) References Cited

U.S. PATENT DOCUMENTS 5,050,840 A * 9/1991 Kondo .................. H01F 7/1607 335/297
7,600,666 B2 * 10/2009 Rabinovich ............ B23P 6/005 228/125

(Continued)

FOREIGN PATENT DOCUMENTS

| | | |
|---|---|---|
| JP | 2018078190 A | 5/2018 |
| JP | 2019054080 A | 4/2019 |
| TW | 200605980 A | 2/2006 |

OTHER PUBLICATIONS

Search Report appended to an Office Action, which was issued to Taiwanese counterpart application No. 112102067 by the TIPO on Jan. 5, 2024, with an English translation thereof.

*Primary Examiner* — Shawki S Ismail
*Assistant Examiner* — Lisa N Homza
(74) *Attorney, Agent, or Firm* — MUNCY, GEISSLER, OLDS & LOWE, P.C.

(57) ABSTRACT

The solenoid actuator includes two solenoid actuator tubes, a non-magnetic ring, and two brazing rings. The two solenoid actuator tubes are aligned and spaced apart. The non-magnetic ring is disposed between the two solenoid actuator tubes. The non-magnetic ring and the solenoid actuator tubes define a plunger bore. The two brazing rings are disposed between non-magnetic ring and the two solenoid actuator tubes. A melting point of the two brazing rings is lower than melting points of the solenoid actuator tubes and the non-magnetic rings. When the solenoid actuator tubes are heated and pressurized, the two solenoid actuator tubes and the non-magnetic ring are able to soften, and the two brazing rings are able to melt and join the two solenoid actuator tubes with the non-magnetic ring. A method for making the solenoid actuator is also disclosed.

6 Claims, 12 Drawing Sheets

(58) Field of Classification Search
USPC .......................................................... 335/279
See application file for complete search history.

(56) References Cited

U.S. PATENT DOCUMENTS

| | | | | |
|---|---|---|---|---|
| 8,253,063 | B2 | 8/2012 | Alexander et al. | |
| 2009/0002109 | A1* | 1/2009 | Stitz ........................ | H01F 7/081 335/281 |
| 2010/0024200 | A1* | 2/2010 | Alexander .............. | H01F 7/081 29/602.1 |

* cited by examiner

SOLENOID ACTUATOR AND METHOD FOR MAKING THE SAME

CROSS-REFERENCE TO RELATED APPLICATION

This application claims priority to Taiwanese Invention Patent Application No. 112102067, filed on Jan. 17, 2023, and incorporated by reference herein in its entirety.

FIELD

The disclosure relates to a solenoid actuator, and more particularly to a solenoid actuator and method for making the same.

BACKGROUND

Referring to FIGS. 1, and 2, a conventional solenoid actuator 1 as disclosed in U.S. Pat. No. 8,253,063 B2 includes a solenoid tube blank 11, a non-magnetic section 12, and a plunger bore 13. A method for making the conventional solenoid actuator 1 includes heating with a laser an area of a circumferential groove 111 of the solenoid tube blank 11, and then depositing a material (different from the material used for the solenoid tube blank 11) for forming the non-magnetic section 12 on the heated area of the circumferential groove 111 so that the material melts and forms the non-magnetic area 12. Afterwards, when the non-magnetic area 12 has cooled down, the plunger bore 13 is machined in the solenoid tube blank 11 so that the non-magnetic area 12 forms a ring which divides the solenoid tube blank 11 into two sections.

However, because the non-magnetic area 12 is formed from material melted by residual heat of the laser heating the circumferential groove 111, the adhesion between the non-magnetic area 12 and the circumferential groove 111 may be less than ideal. Additionally, because the material of the non-magnetic area 12 is simply layered on the circumferential groove 111, air pockets may form which lowers the structural integrity of the conventional solenoid actuator 1, and cause the conventional solenoid actuator 1 to break when compressed.

SUMMARY

Therefore, an object of the disclosure is to provide a conventional solenoid actuator and a method of making the conventional solenoid actuator that can alleviate at least one of the drawbacks of the prior art.

According to the disclosure, the solenoid actuator includes two solenoid actuator tubes, a non-magnetic ring, and two brazing rings. The two solenoid actuator tubes are aligned and spaced apart along an axis. The non-magnetic ring has two opposite end sections and is disposed between the two solenoid actuator tubes. The non-magnetic ring and the solenoid actuator tubes cooperatively define a plunger bore that extends along the axis. Each of the two brazing rings are disposed between one of the opposite ends of the non-magnetic ring and an adjacent one of the two solenoid actuator tubes. A melting point of the two brazing rings is lower than melting points of the solenoid actuator tubes and the non-magnetic rings. When the solenoid actuator tubes are heated and pressurized along the axis, the two solenoid actuator tubes and the non-magnetic ring are able to soften, and the two brazing rings are able to melt and join the two solenoid actuator tube blanks with the non-magnetic ring.

The method for making the solenoid actuator includes: a) assembling together two solenoid actuator tubes, a non-magnetic ring, and two brazing rings, all of which are aligned along an axis, the non-magnetic ring has two opposite ends sections and is located between the two solenoid actuator tubes, each of the brazing rings is disposed between one of the two opposite end sections of the non-magnetic ring and an adjacent one of the two solenoid actuator tubes, each of the two solenoid actuator tubes partially extending into a respective one of the two opposite end sections of the non-magnetic ring, a melting point of the two brazing rings being lower than melting points of each of the solenoid actuator tubes and the non-magnetic rings; B) heating the two brazing rings, the two solenoid actuator tubes, and the non-magnetic ring until the two brazing rings melt, and until the two solenoid actuator tubes and the non-magnetic ring soften; C) applying pressure to the two solenoid actuator tubes, the non-magnetic ring and the two brazing rings from tow opposite ends of the solenoid actuator tubes along the axis; and D) after the solenoid actuator tubes, the non-magnetic ring, and the brazing rings have cooled, conducting a machining step to form a plunger bore inside the two solenoid actuator tubes and the non-magnetic ring along the axis (L).

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
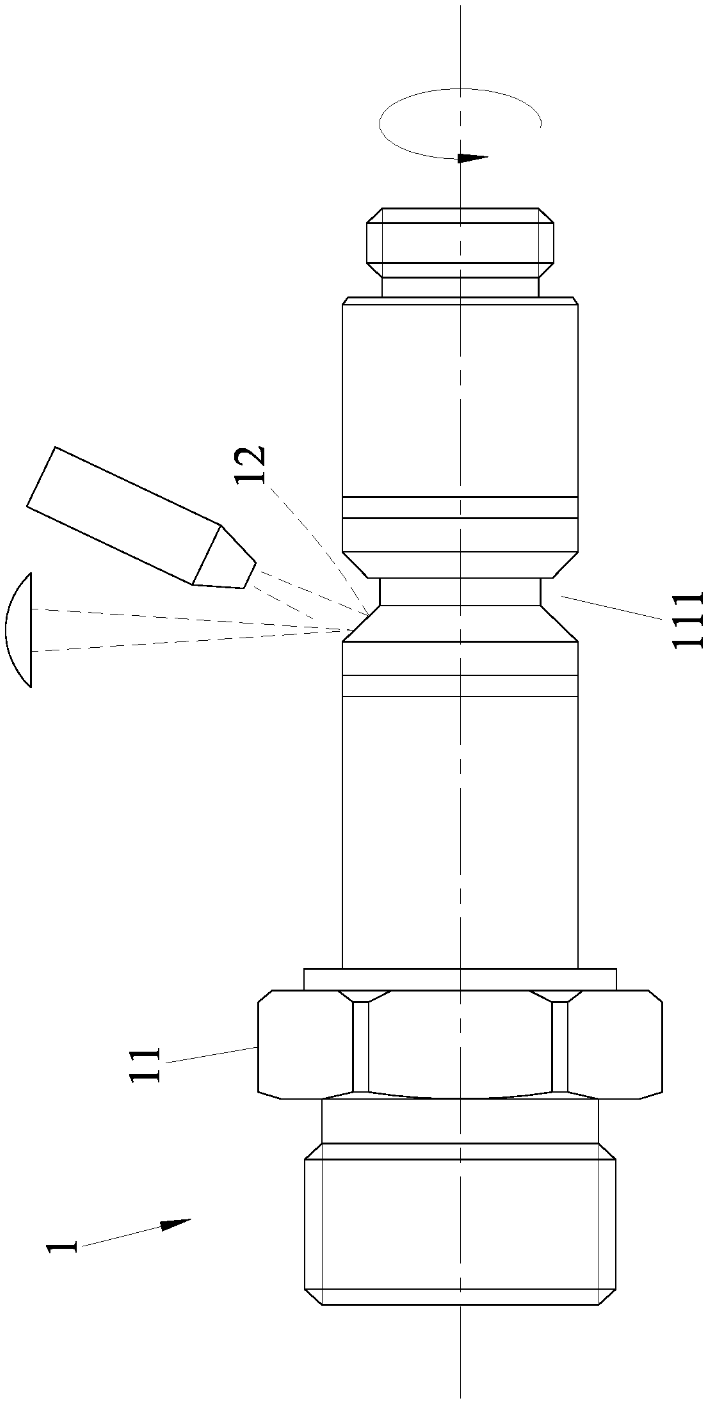
FIG. 1 PRIOR ART
FIG. 1 is a schematic side view illustrating a conventional solenoid actuator disclosed by U.S. Pat. No. 8,253,063 B2.
Figure 2:
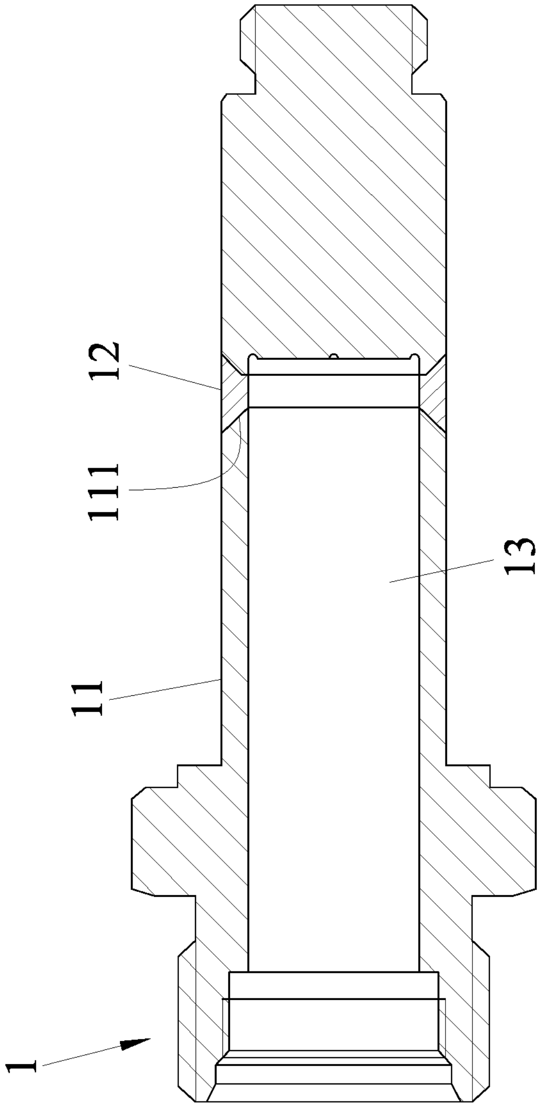
FIG. 2 PRIOR ART
FIG. 2 is a cross-sectional view illustrating the conventional solenoid actuator.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
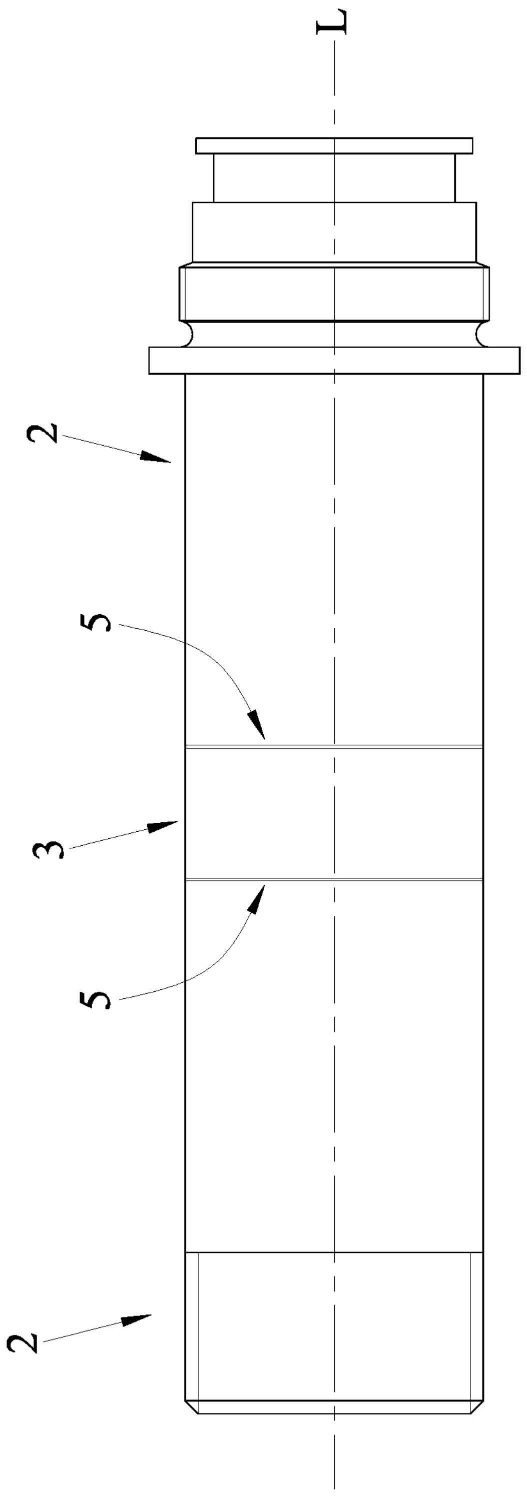
FIG. 3 is a side view illustrating an embodiment of a solenoid actuator according to the present disclosure.
Figure 4:
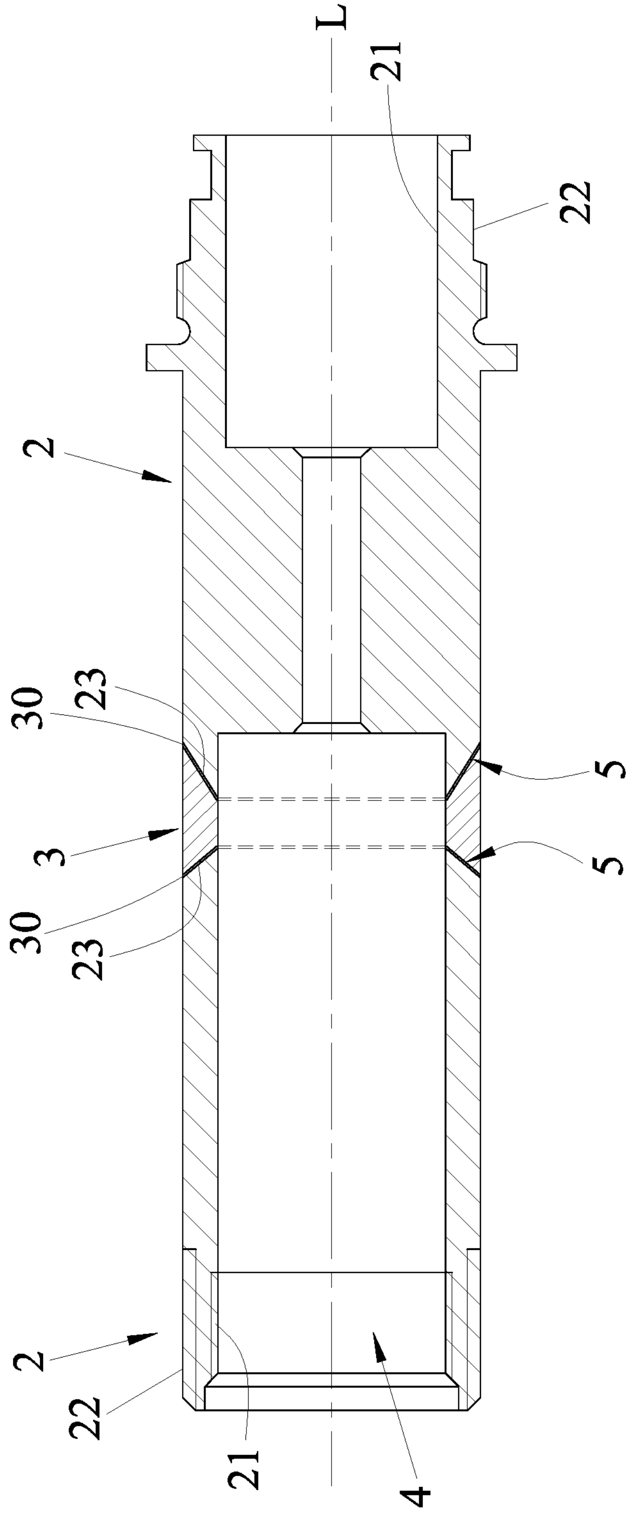
FIG. 4 is a cross-sectional view of the embodiment in FIG. 3.
Figure 5:
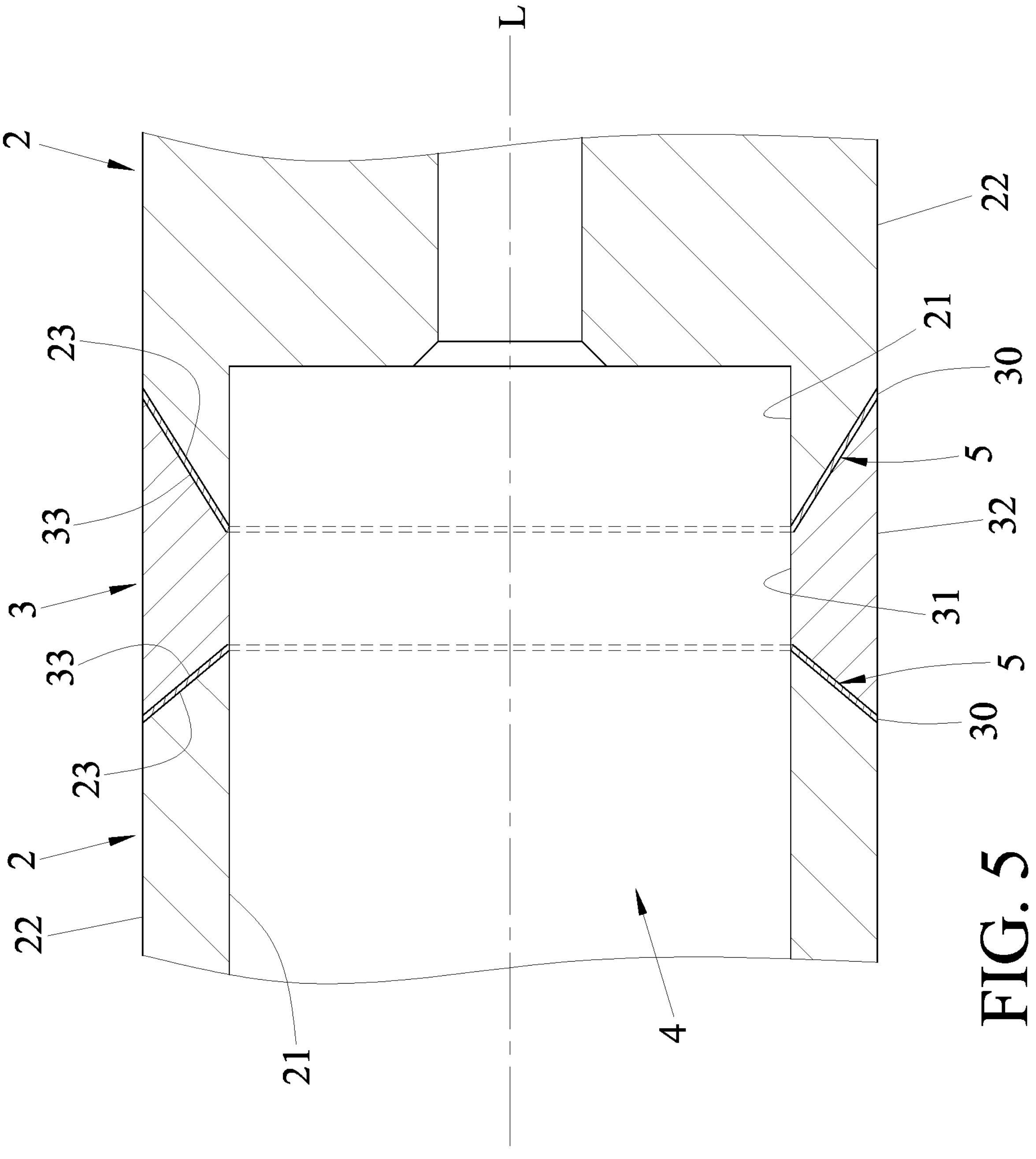
FIG. 5 is a fragmentary enlarged view of the embodiment in FIG. 4.
Figure 6:
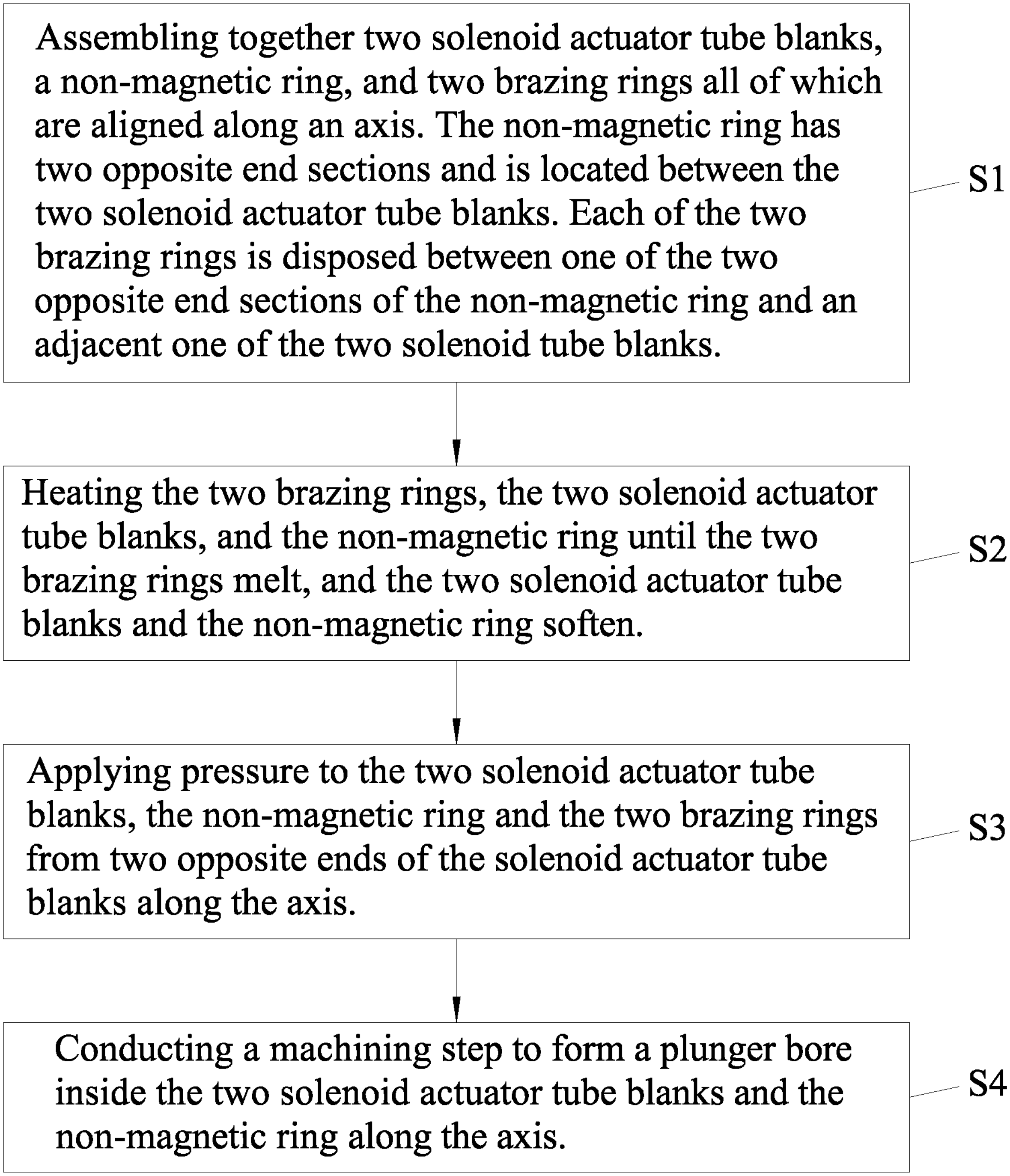
FIG. 6 is a block diagram showing an embodiment of a method for making the solenoid actuator according to the present disclosure.

Referring to FIGS. 3, 4 and 5, an embodiment of a solenoid actuator according to the present disclosure includes two solenoid actuator tubes 2, a non-magnetic ring 3, and two brazing rings 5.

The two solenoid actuator tubes 2 are aligned and spaced apart along an axis (L). Each of the solenoid actuator tubes 2 has an inner tube surface 21, an outer tube surface 22 that is radially opposite to the inner tube surface 21 with respect to the axis (L), and a tapering tube end face 23 that interconnects the inner tube surface 21 and the outer tube surface 22. The inner tube surface 21 of each solenoid actuator tube 2 surrounds the axis (L). The tapering tube end face 23 of each solenoid actuator tube 2 tapers from the outer tube surface 22 to the inner tube surface 21 of the solenoid actuator tube 2. The tapering tube end faces 23 of the solenoid actuator tubes 2 face each other.

In this embodiment, each of the solenoid actuator tubes (2) is made of iron.

The non-magnetic ring 3 is disposed between the two solenoid actuator tubes 2. The non-magnetic ring 3 has an inner ring surface 31, an outer ring surface 32 that is radially opposite to the inner ring surface 31 with respect to the axis (L), and two opposite end sections 30, which each has a conically converging end surface 33 that are spaced apart from each other along the axis (L). The inner ring surface 31 of the non-magnetic ring 3 surrounds the axis (L). Each conically converging end surface 33 interconnects the inner and outer ring surfaces 31, 32, and converges inwardly from the outer ring surface 32 to the inner ring surfaces 31.

The non-magnetic ring 3 is made of one of copper, copper alloy, stainless steel, and aluminum. It should be noted that in this embodiment, the non-magnetic ring 3 is made of copper.

The non-magnetic ring 3 and the solenoid actuator tubes 2 cooperatively define a plunger bore 4 that extends along the axis (L).

Each of the two brazing rings 5 is disposed between one of the opposite ends 30 of the non-magnetic ring 3 and an adjacent one of the two solenoid actuator tubes 2. More specifically, each of the two brazing rings 5 are disposed between a tapering tube end faces 23 and an adjacent one of the converging end surfaces 33.

In this embodiment, a melting point of the two brazing rings 5 is lower than melting points of the solenoid actuator tubes 2 and the non-magnetic rings 3, and the brazing rings 5 are ring-shaped brazing sheet preforms that are made of a material containing silver. More specifically, each of the two brazing rings 5 is a ring-shaped brazing sheet preform that has a contour corresponding to a contour of the conically converging surface 33 of a respective one of the end sections 30 of the non-magnetic ring 3 and that is disposed between and in abutment with the conically converging end surface 33 and the tapering end face 23.

When the solenoid actuator tubes 2 are heated and pressurized along the axis (L), the two solenoid actuator tubes 2 and the non-magnetic ring 3 are able to soften, and the two brazing rings 5 are able to melt and join the two solenoid actuator tubes 2 with the non-magnetic ring 3.

The plunger bore 4 is for the accommodation of a plunger (not shown). Since using a plunger to provide linear motion in the solenoid actuator is well known in the art, further details are omitted for the sake of brevity.

Referring to FIGS. 6 to 9, an embodiment of a method for making the solenoid actuator according to the present disclosure includes the steps S1 to S4.

Figure 7:
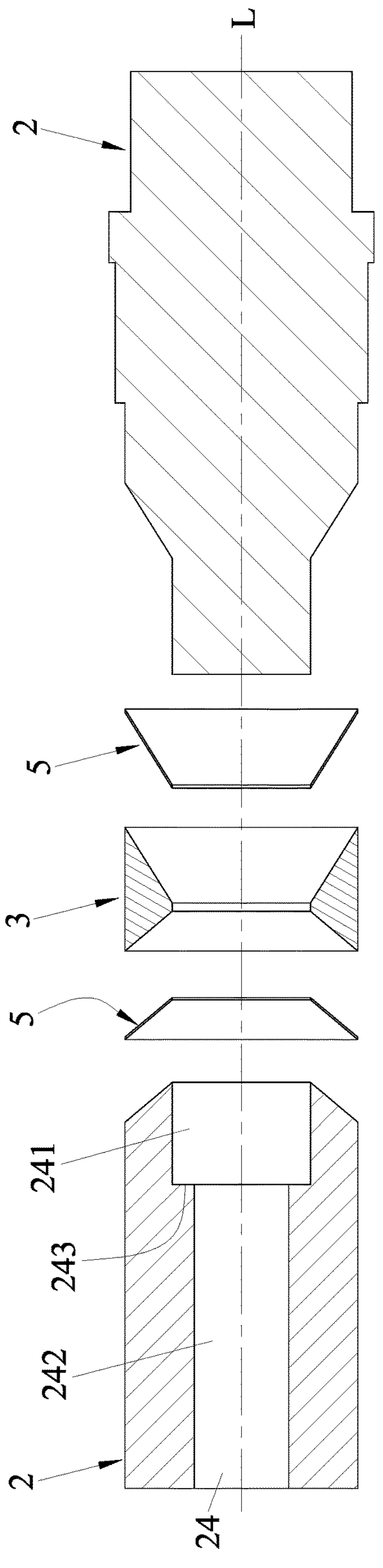
FIG. 7 to FIG. 9 are cross-sectional schematic views illustrating the method.
Figure 8:
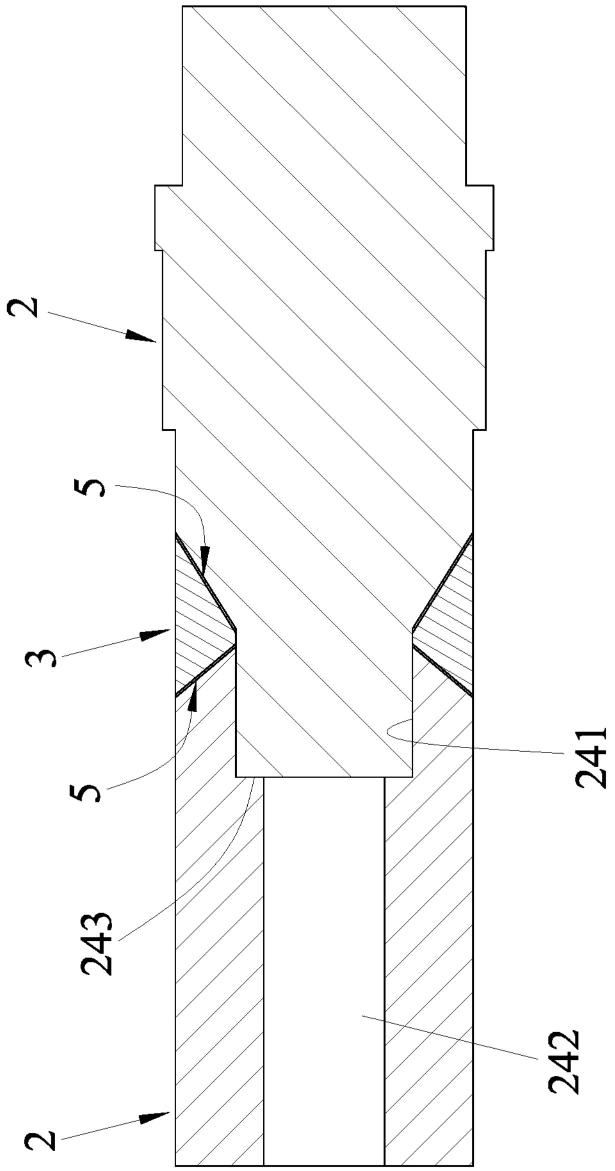

Referring to FIGS. 7, and 8, in a step S1, all of two solenoid actuator tubes 2, a non-magnetic ring 3, and two brazing rings 5 are aligned along an axis (L) and are assembled together. The non-magnetic ring 3 has two opposite end sections 30 located between the two solenoid actuator tube blanks 2. Each of the two brazing rings 5 is disposed between one of the two opposite end sections 30 of the non-magnetic ring 3 and an adjacent one of the two solenoid actuator tubes 2. Each of the two solenoid actuator tubes 2 partially extends into a respective one of the two opposite end sections 30 of the non-magnetic ring 3. A melting point of the two brazing rings 5 is lower than melting points of the solenoid actuator tubes 2 and the non-magnetic ring 2.

Figure 9:
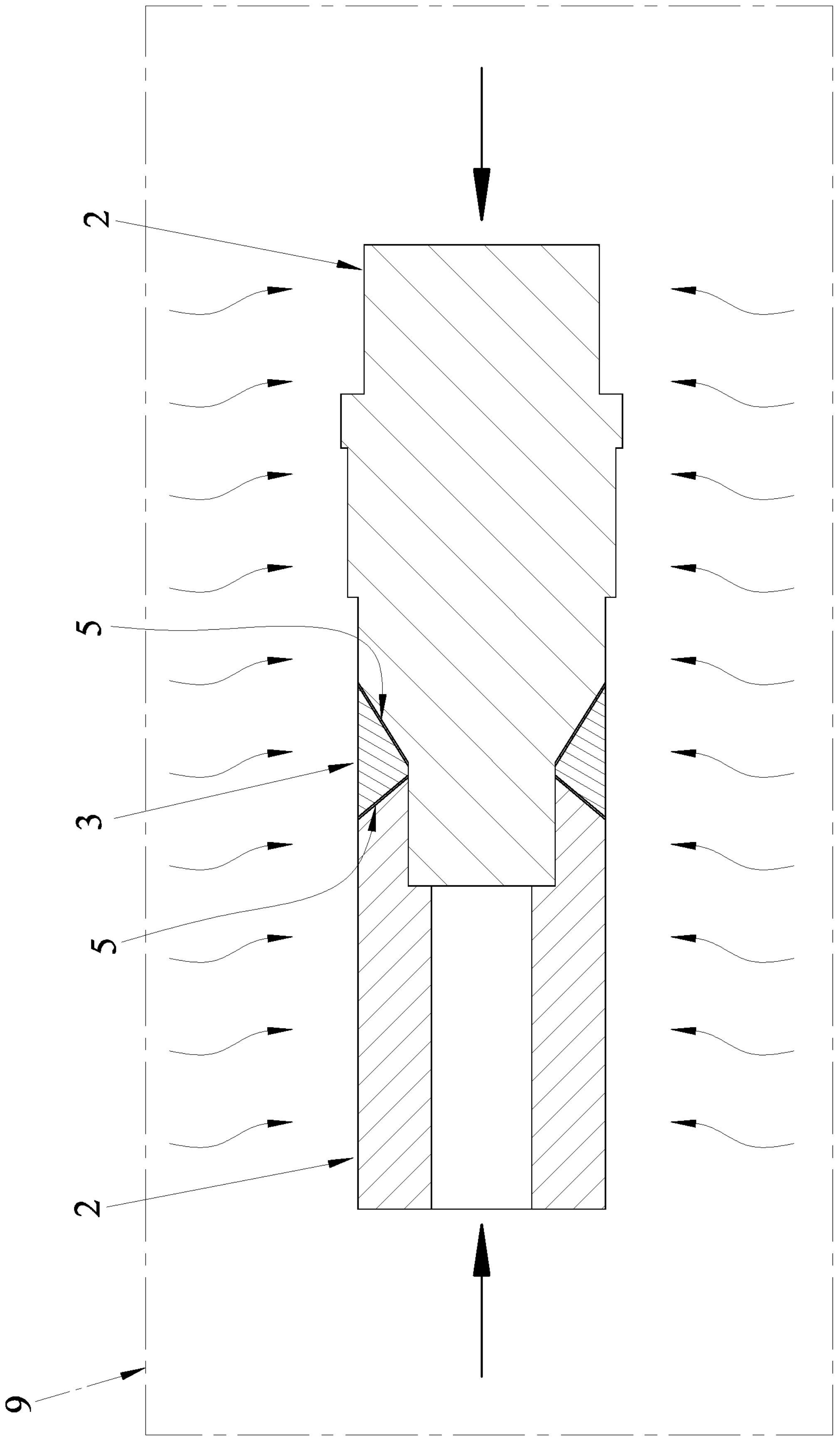

Referring to FIG. 9, in a step S2, the two brazing rings 5, the two solenoid actuator tubes 2, and the non-magnetic ring 3 are placed in a vacuum chamber 9 and heated with far infrared radiation until the two brazing rings 5 melt, and until the two solenoid actuator tubes blanks 2 and the non-magnetic ring 3 soften.

In this embodiment, the vacuum chamber 9 has a vacuum pressure that ranges from −0.1 bar to 0 bar, and two brazing rings 5, the two solenoid actuator tubes 2 and the non-magnetic ring 3 are heated to a temperature that ranges from 800° C. to 1050° C. The solenoid actuator tubes 2 have a softening degree of 40%, and the non-magnetic ring 3 has a softening degree of 60% to 70%

Figure 10:
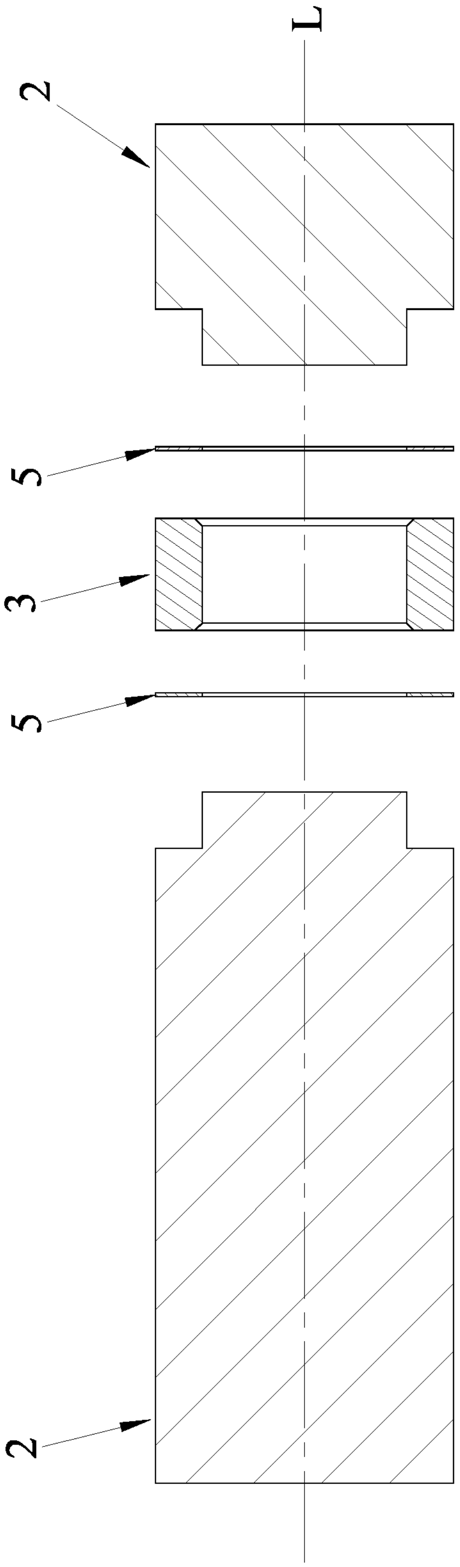
FIGS. 10 to 12 are cross-sectional schematic views illustrate a method for making a variation of the embodiment.

Referring to FIG. 10, in the step S3, a pressure is applied to the two solenoid actuator tubes 2, the non-magnetic ring 3 and the two brazing rings 5 from two opposite ends of the solenoid actuator tubes 2 along the axis (L) in the vacuum chamber 9.

When the pressure is applied on the two solenoid actuator tubes 2, the non-magnetic ring 3 and the two brazing rings 5 from two opposite ends of the solenoid actuator tubes 2 along the axis (L) in the vacuum chamber 9, particles of the solenoid actuator tubes 2 and the non-magnetic ring 3 undergo surface diffusion, and particles on opposite surfaces of each of the brazing rings 5 also undergo surface diffusion so that bonding ability between the components is increased. In this embodiment, the pressure is applied from two opposite ends of the solenoid actuator tubes 2 along the axis (L), and the applied pressure is 4 bar to 5 bar. However, in other embodiments, the pressure may be applied from only one of the opposite ends of the solenoid actuator tubes 2. The vacuum chamber 9 is maintained at approximated 1000° C. during the pressurization.

In this embodiment, when the solenoid actuator tubes 2 are heated, the solenoid actuator tubes 2 and the non-magnetic ring 3 soften, and the brazing rings 5 melt. This assists the pressurization process, and ensures that the solenoid actuator tubes 2, the non-magnetic ring 3, and the two brazing rings 5 may have good adhesion when the solenoid actuator tubes 2 are pressurized along the axis (L), thereby avoiding the formation of air pockets, increasing the adhesion and structural integrity between components, and allowing the solenoid actuator thus manufactured to function under highly pressurized environments.

Referring to FIG. 4, in the step S4, after the solenoid actuator tubes 2, the non-magnetic ring 3, and the brazing rings 5 have cooled, a machining step is conducted to form a plunger bore 4 inside the two solenoid actuator tubes 2 and the non-magnetic ring 3. Furthermore, the outer ring surface 22 is machined to a specified shape.

Figure 11:
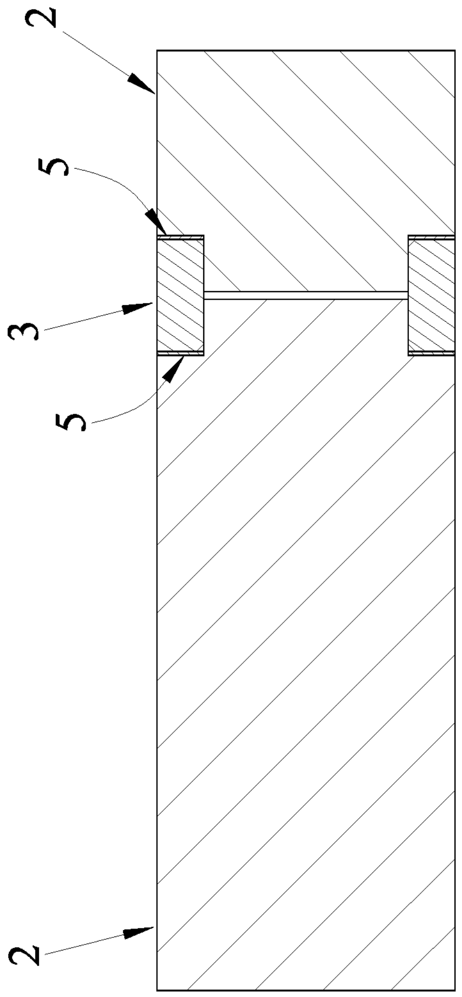
Figure 12:
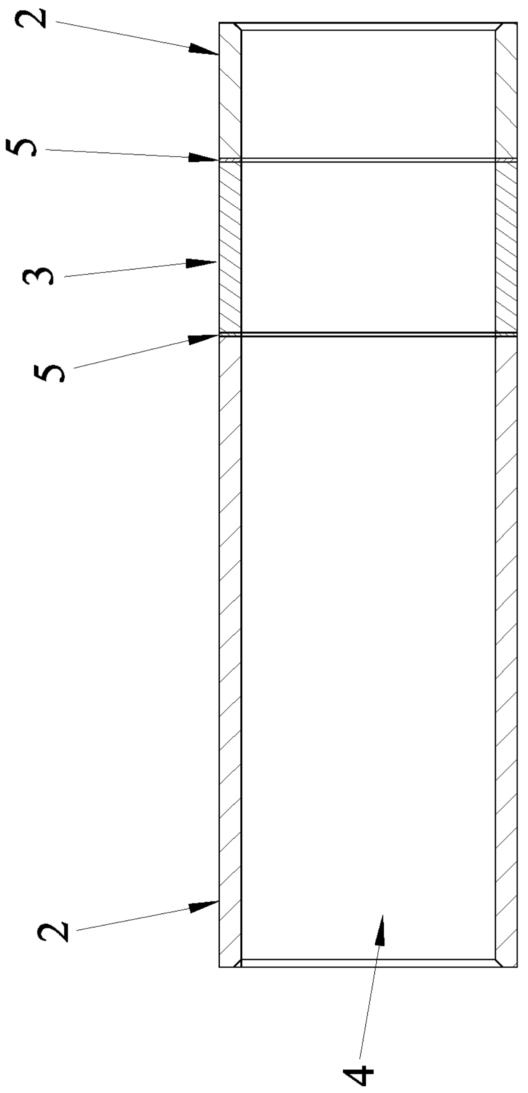

In this embodiment, one of the two solenoid actuator tubes 2 is a solid cylinder and the other one of the solenoid actuator tubes 2 is a hollow cylinder that includes a hole 24 extending along the axis (L) for insertion of a portion of the solid cylinder. The hole 24 has a large hole section 241 that is proximate to the solid cylinder, a small hole section 242 that is distal from the solid cylinder and that has a diameter which is smaller than that of the large hole section 241, and a shoulder section 243 at a junction of the large hole section 241 and the small hole section 242. It should be noted that the solid cylinder partially extends into the large hole section 241 and abuts against the shoulder section 243, thereby preventing the two solenoid actuator tubes 2 from separating during machining. However, referring to FIGS. 10 to 12, in other embodiments, the two solenoid actuator tubes blanks 2 may be completely solid, and the plunger bore 4 may be machined after heating and pressurization.

In the present disclosure, by virtue of the melting point of the two brazing rings 5 being lower than melting points of the solenoid actuator tubes 2 and the non-magnetic rings 3, and each of the two brazing rings 5 being disposed between one of the opposite ends of the non-magnetic ring 3 and an adjacent one of the two solenoid actuator tubes 2, when the solenoid actuator tubes 2 are heated and pressurized along the axis (L), the two solenoid actuator tubes 2 and the non-magnetic ring 3 are able to soften, and the two brazing rings 5 are able to melt and join the two solenoid actuator tubes 2 with the non-magnetic ring 3, thereby increasing the structural integrity between components of the solenoid actuator.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A solenoid actuator comprising:

two solenoid actuator tubes aligned and spaced apart along an axis;

a non-magnetic ring having two opposite end sections and being disposed between said two solenoid actuator tubes, said non-magnetic ring and said solenoid actuator tubes cooperatively defining a plunger bore that extends along the axis; and two brazing rings, each of said two brazing rings being disposed between one of said opposite ends of said non-magnetic ring and an adjacent one of said two solenoid actuator tubes, a melting point of said two brazing rings being lower than melting points of said solenoid actuator tubes and said non-magnetic rings;

wherein when said solenoid actuator tubes are heated and pressurized along the axis, said two solenoid actuator tubes and said non-magnetic ring are able to soften, said two brazing rings are able to melt and join said two solenoid actuator tube blanks with said non-magnetic ring; and wherein said non-magnetic ring has radially opposite inner and outer ring surfaces, each of said end sections of said non-magnetic ring has a conically converging end surface that interconnects between said inner and outer ring surfaces, and converges inwardly from said outer ring surface to said inner ring surface.

2. The solenoid actuator as claimed in claim 1, wherein said two brazing rings are ring-shaped brazing sheet preforms that are made of a material containing silver.

3. The solenoid actuator as claimed in claim 1, wherein said non-magnetic ring is made of one of copper, copper alloy, stainless steel, and aluminum.

4. The solenoid actuator as claimed in claim 1, wherein each of said solenoid actuator tubes is made of iron.

5. The solenoid actuator as claimed in claim 1, wherein one of said solenoid actuator tubes is a solid cylinder, and the other one of said solenoid actuator tubes is a hollow cylinder that includes a hole extending along the axis for insertion of a portion of said solid cylinder, said hole having a large hole section that is proximate to said solid cylinder, a small hole section that is distal from said solid cylinder and that has a diameter smaller than that of said large hole section, and a shoulder section at a junction of said large hole section and said small hole section, said solid cylinder partially extending into said large hole section and abutting against said shoulder section.

6. The solenoid actuator as claimed in claim 1, wherein each of the two solenoid actuator tubes has a tapering tube end face, each of said two brazing rings being a ring-shaped brazing sheet preform that has a contour corresponding to a contour of said conically converging end surface of a respective one of said end sections of said non-magnetic ring and that is disposed between and in abutment with said conically converging end surface and said tapering tube end face.

* * * * *